(12) United States Patent
Mikami et al.

(10) Patent No.: US 10,022,743 B2
(45) Date of Patent: Jul. 17, 2018

(54) COATING FILM PRODUCTION METHOD, COATING FILM PRODUCTION APPARATUS, COATING FILM, NONAQUEOUS SECONDARY BATTERY ELECTRODE PLATE, AND MOBILE BODY

(71) Applicant: Panasonic Intellectual Property Management Co., Ltd., Osaka (JP)

(72) Inventors: Masateru Mikami, Osaka (JP); Masashi Hamabe, Osaka (JP); Takao Kuromiya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 456 days.

(21) Appl. No.: 14/788,789

(22) Filed: Jul. 1, 2015

(65) Prior Publication Data

US 2016/0082467 A1    Mar. 24, 2016

(30) Foreign Application Priority Data

Sep. 18, 2014   (JP) ................................ 2014-189505

(51) Int. Cl.
*B05C 1/08* (2006.01)
*H01M 4/04* (2006.01)
*H01M 4/139* (2010.01)
*B05C 9/04* (2006.01)
*H01M 10/0525* (2010.01)
(Continued)

(52) U.S. Cl.
CPC .......... *B05C 1/0834* (2013.01); *B05C 1/0804* (2013.01); *B05C 9/04* (2013.01); *H01M 4/0409* (2013.01); *H01M 4/139* (2013.01); *B05C 1/083* (2013.01); *B05D 1/26* (2013.01);
(Continued)

(58) Field of Classification Search
None
See application file for complete search history.

(56) References Cited

U.S. PATENT DOCUMENTS

2009/0316334 A1\* 12/2009 Fukumine .............. H01G 11/24
  361/502
2010/0229859 A1\*  9/2010 Hodson ................ A61K 9/0075
  128/203.15
(Continued)

FOREIGN PATENT DOCUMENTS

JP    2009-004537 A    1/2009
JP    2011-175740 A    9/2011
(Continued)

OTHER PUBLICATIONS

English Translation of Chinese Search Report dated Jul. 20, 2017 for the related Chinese Patent Application No. 201510586667.9.

*Primary Examiner* — Alix E Eggerding
(74) *Attorney, Agent, or Firm* — Panasonic IP Management; Kerry S. Culpepper (57) ABSTRACT

When a coating material is rolled between rolls to generate a a coating film, and the coating film is transferred onto the coating object, at first, a residual coating material layer based on a residual coating material is formed on each of the surfaces of the rolls, and supply of the coating material and transfer of the coating film are carried out in a state where the residual coating material layer is retained on each of the surfaces of the rolls, thereby suppressing abrasions between the rolls and the coating material.

11 Claims, 6 Drawing Sheets

(51) Int. Cl.
 *B05D 1/26* (2006.01)
 *B05D 1/28* (2006.01)
(52) U.S. Cl.
 CPC ............ *B05D 1/28* (2013.01); *B05D 2252/02* (2013.01); *H01M 10/0525* (2013.01)

(56) References Cited

U.S. PATENT DOCUMENTS

2011/0052954 A1* 3/2011 Fujiwara ............ H01M 4/0404
 429/94
2014/0342225 A1 11/2014 Isshiki et al.

FOREIGN PATENT DOCUMENTS

| JP | 2013-077560 | 4/2013 |
| JP | 2014-133194 A | 7/2014 |
| JP | 2014-139887 A | 7/2014 |

\* cited by examiner

PRIOR ART

FIG. 6

COATING FILM PRODUCTION METHOD, COATING FILM PRODUCTION APPARATUS, COATING FILM, NONAQUEOUS SECONDARY BATTERY ELECTRODE PLATE, AND MOBILE BODY

TECHNICAL FIELD

The technical field relates to a production method and a production apparatus that produces a coating film by transferring a coating material onto a coating object, a nonaqueous secondary battery electrode plate, and a mobile body.

BACKGROUND

With recent achievement of multifunctional purposes such as for electronic devices, communication devices and automobiles, electrochemical elements such as lithium ion batteries, lead batteries and capacitors require further improvements of properties, such as higher output or higher capacity and improvements of mechanical properties. In such a situation, improvements in performance of electrodes for electrochemical elements have been attempted in order to improve performance of electrochemical elements.

An electrode for electrochemical elements is formed, for example, by forming, into a sheet, an electrode material containing an electrode active material and the like, followed by press-bonding the sheet (electrode composition layer) as a coating material onto a collector. JP-A-2013-77560 describes a method in which composite particle powder including an active material, a conductive material and a binder is supplied as a coating material to a space between a pair of rolls that rotate in the opposite direction to each other, is compressed to attach the coating material onto the surface of one of the rolls, and the coating material is transferred onto a collector, thereby producing an electrode for electrochemical elements.

Figure 5:
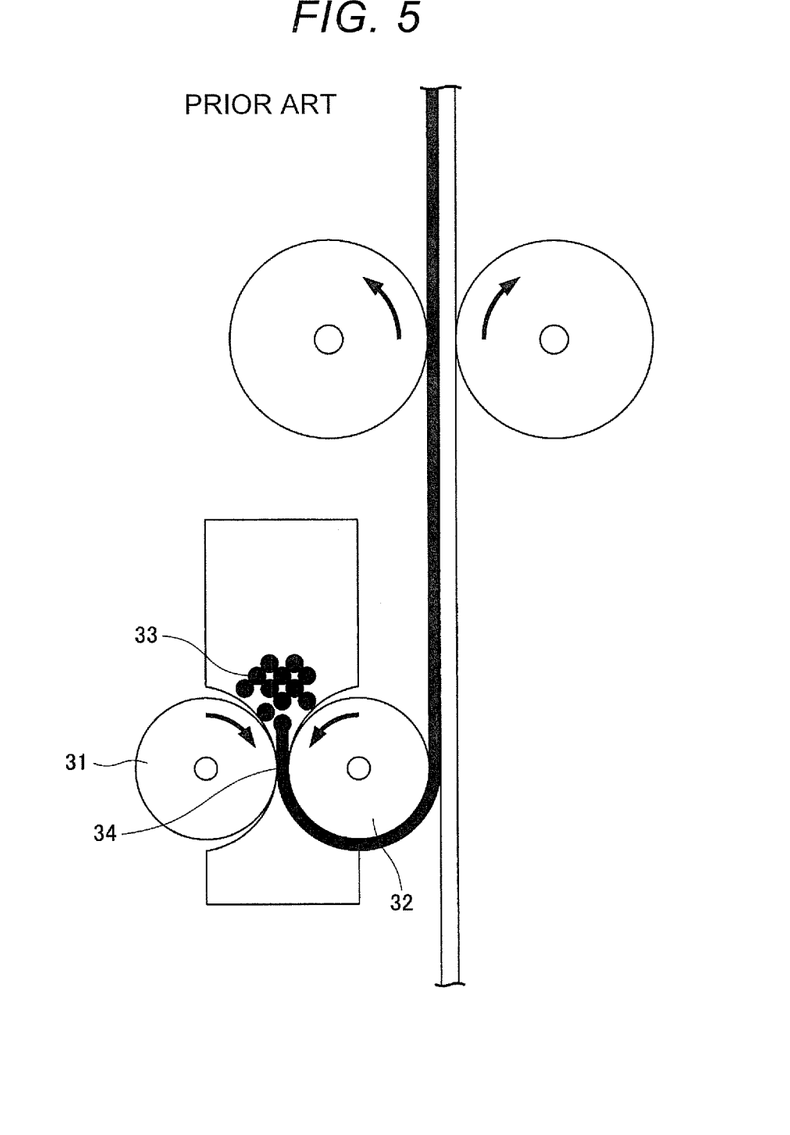
FIG. 5 is a diagram that shows a configuration of a coating film production apparatus of JP-A-2013-77560.

However, in the technique described in JP-A-2013-77560, as shown in FIG. 5, in order to completely transfer a mixture coating material 33, which is a coating material, from a first roll 31 onto a second roll 32, the mixture coating material 33 is supplied continuously and directly onto the surface of the first roll 31 in a roll gap 34. Consequently, the surface of the first roll 31 is easily abraded due to friction between the surface of the first roll 31 and the mixture coating material 33.

When the surface of the first roll 31 is abraded, residual extraneous materials are generated from the surface of the first roll 31. At a time of production of an electrochemical element or an electrochemical reaction, a short-circuit is easily caused between a cathode and an anode due to such residual extraneous materials, causing defectiveness. Therefore, there are problems that this results in deteriorations in the quality of the electrode for electrochemical elements and that the production efficiency will also be deteriorated.

SUMMARY

In view of the above problems, as well as other concerns, an object is to suppress abrasions between rolls and a coating material in a method in which the coating material is rolled between the rolls to form a coating film, and the coating film is transferred onto the coating object.

In order to achieve the above object, a coating film production method includes: allowing a coating material to penetrate into a gap between a first roll and a second roll that rotates in an opposite direction to the first roll, to generate a coating material in the form of a coating film on a surface of the second roll; and transferring the coating material in the form of a coating film, which is generated on the surface of the second roll, onto a coating object running on a circumferential surface of a third roll that rotates in an opposite direction to the second roll, in the form of the coating film, wherein a residual coating material, which is formed by a portion of the coating material remaining on each of circumferential surfaces of the first roll and the second roll before the circumferential surfaces move to the gap, is present thereon. Furthermore, provided is a coating film production apparatus that coats a coating material including coating particles onto a coating object, the apparatus at least including: a first roll and a second roll that roll the supplied coating material to generate a coating material in the form of a coating film; and a residual coating material that remains on each of surfaces of the first roll and the second roll, wherein the coating material is supplied from a gap between the first roll and the second roll, the residual coating material is a portion of the supplied coating material that remains on each of the surfaces of the first roll and the second roll, and the coating material in the form of a coating film is transferred from the second roll onto the running coating object.

When a coating material is rolled between rolls to generate a coating film, and the coating film is transferred onto a coating object, at first, residual coating material layers are formed on the surfaces of the rolls with residual coating materials thereon, and supply of the coating material and transfer of the coating film are carried out in a state where the residual coating material layers are retained on the surfaces of the rolls. Consequently, abrasions between the rolls and the coating material can be suppressed.

DESCRIPTION OF EMBODIMENTS

Various exemplary embodiments will be described below with reference to drawings. In addition, the same elements are referred to by the same reference symbols, thereby appropriately omitting some explanations therefor, in the following description.

Embodiments

Figure 1:
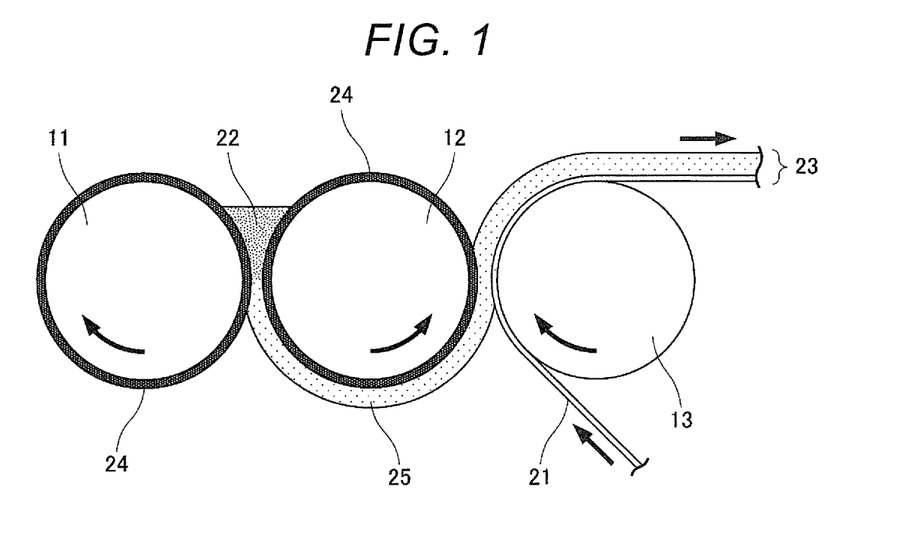
FIG. 1 is a diagram that illustrates an outline configuration of a coating film production apparatus according to an embodiment.

FIG. 1 is a diagram that illustrates an outline configuration of a coating film production apparatus according to an embodiment.

FIG. 1 shows a state in which a wet mixture coating material 22 (an example of a coating material for a coating film), penetrating into a gap between a first roll 11 and a second roll 12, is formed into a coating film on the surface of the second roll 12, the wet mixture coating material 22 in the form of a coating film is then transferred from the second roll 12 onto a coating object 21 running on a third roll 13, and the coating film 23 is delivered. The wet mixture coating material 22, which is an example of a coating material for a coating film, is a solution including coating particles as a solute in a solvent.

As shown in FIG. 1, the first roll 11, the second roll 12 and the third roll 13 are cylindrical rolls, and are placed therein in that order at regular intervals. The wet mixture coating material 22 is supplied to a gap between the first roll 11 and the second roll 12. The supplied wet mixture coating material 22 is rolled with the first roll 11 and the second roll 12 based on a shearing force so as to be spread into a thin layer, thereby generating a wet mixture coating material 25 in the form of a coating film on the second roll 12, and the wet mixture coating material 25 is delivered to the third roll 13. The third roll 13 is used for supply of the coating object 21. The coating object 21 runs along the surface of the third roll 13, and is supplied to a gap between the second roll 12 and the third roll 13. The wet mixture coating material 25, which has been formed into a coating film, is transferred onto the surface of the coating object 21 in a gap between the second roll 12 and the third roll 13, thereby forming a coating object 23.

In this case, the third roll 13 rotates in the opposite direction to the second roll 12, and the coating object 21 runs in the same direction as the rotating direction of the third roll 13 between the second roll 12 and the third roll 13 at the same speed as the circumferential speed of the third roll 13.

In the configuration shown in FIG. 1, a circumferential speed ratio of the first roll 11 and the second roll 12, which are adjacent to each other, may be made different from a circumferential speed ratio of the second roll 12 and the third roll 13, as described below.

In addition, another roll may be present between the second roll 12 and the third roll 13, as needed.

The first roll 11, the second roll 12 and the third roll 13 are placed parallel to one another, and the width of the gap between the first roll 11 and the second roll 12, as well as the width of the gap between the second roll 12 and the third roll 13 are preferably made uniform over all the widths of gaps between the rolls. This makes a thickness of the wet mixture coating material 25 in the form of a coating film, formed on the second roll 12, uniform. As a result, a coating film that has a uniform thickness in the width direction, which is a direction vertical to the running direction of the coating object 21, is formed on the coating object 21. In addition, the thickness of the coating film can arbitrarily be changed by varying a value for gaps between the rolls.

In this coating step, as for materials for the first roll 11, the second roll 12 and the third roll 13, materials having a higher surface hardness, such as SUS, that are not affected by the hardness of the wet mixture coating material 22 are preferable.

The present embodiment features as follows: when supplying the wet mixture coating material 22, at first, the wet mixture coating material 22 is allowed to remain as a thin and uniform layer on each of the circumferential surfaces of the first roll 11 and the second roll 12, thereby forming a residual mixture coating material 24, and coating film production is carried out in a state where the residual mixture coating material 24 is allowed to remain thereon. More specifically, for example, when the wet mixture coating material 22, which has penetrated into the gap between the first roll 11 and the second roll 12, is formed into a coating film, and is then transferred onto the circumferential surface of the second roll 12, a thin layer of the residual mixture coating material 24 remains on the circumferential surface of the first roll. In addition, when the wet mixture coating material 22 in the form of a coating film on the circumferential surface of the second roll 12 is transferred onto the coating object 21, a thin layer of the residual mixture coating material 24 remains on the circumferential surface of the second roll 12.

When the thin residual mixture coating material 24 that remains on the first roll 11 or the second roll 12 is made sufficiently thinner and more uniform than the thickness of the film formed on the coating object 21, there are almost no influences on a film thickness or weight of the wet mixture coating material 25 transferred onto the coating object 21.

By forming a thin layer of the residual mixture coating material 24 on the circumferential surface of the first roll 11 or the second roll 12, the wet mixture coating material 22 charged to the gap between the first roll 11 and the second roll 12 will not come into direct contact with the roll surfaces afterwards, and therefore, abrasions of the roll surfaces can be suppressed. Also, in cases where there are variations in the thickness of the coating object 21 or there are minute extraneous materials on the circumferential surface of the third roll 13, the residual mixture coating material 24 that has been formed into a thin layer on the circumferential surface of the second roll 12 will buffer such variations of the thickness of the coating object 21 or the thickness unevenness due to minute extraneous materials. Consequently, a coating film 23 having uniform thickness can be provided. In addition, by forming, on each of the surfaces of the first roll 11 and the second roll 12, a residual mixture coating material 24 that includes the wet mixture coating material 22 and that is softer than the first roll 11 and the second rolls 12, coating particles are buffered by the residual mixture coating material 24, and, consequently, disruption of the coating particles will be more sufficiently suppressed as compared with a case where the wet mixture coating material 22 comes into direct contact with the first roll 11 and the second roll 12, when the supplied wet mixture coating material 22 passes through the gap between the first roll 11 and the second roll 12 so as to be rolled.

Next, steps of producing a coating film will be described by using FIGS. 2A-2C.

Figure 2A:
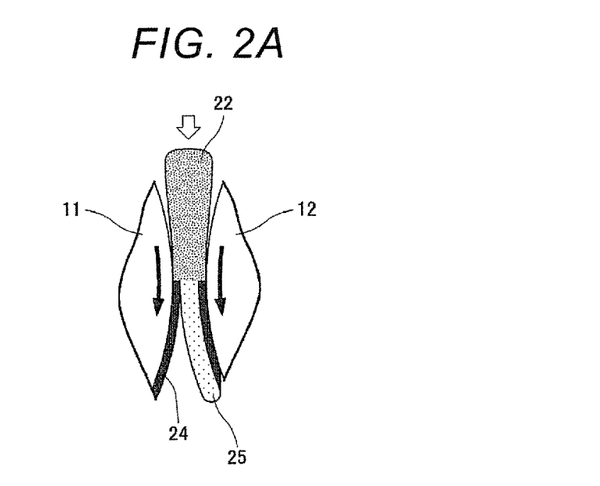
FIGS. 2A-2C are schematic diagrams that illustrate each step in a coating film production method according to an embodiment.
Figure 2B:
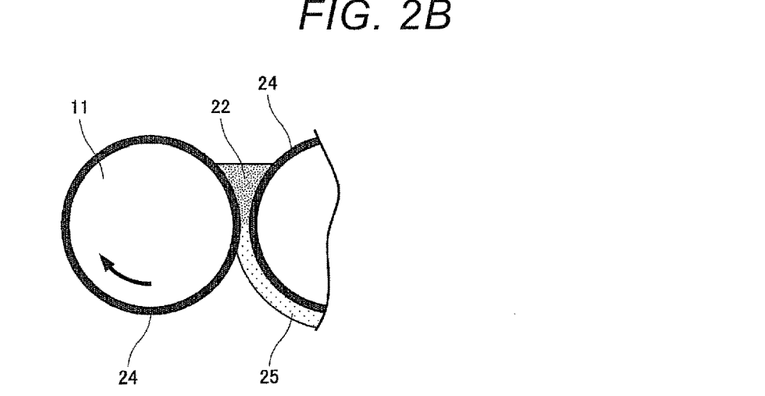
Figure 2C:
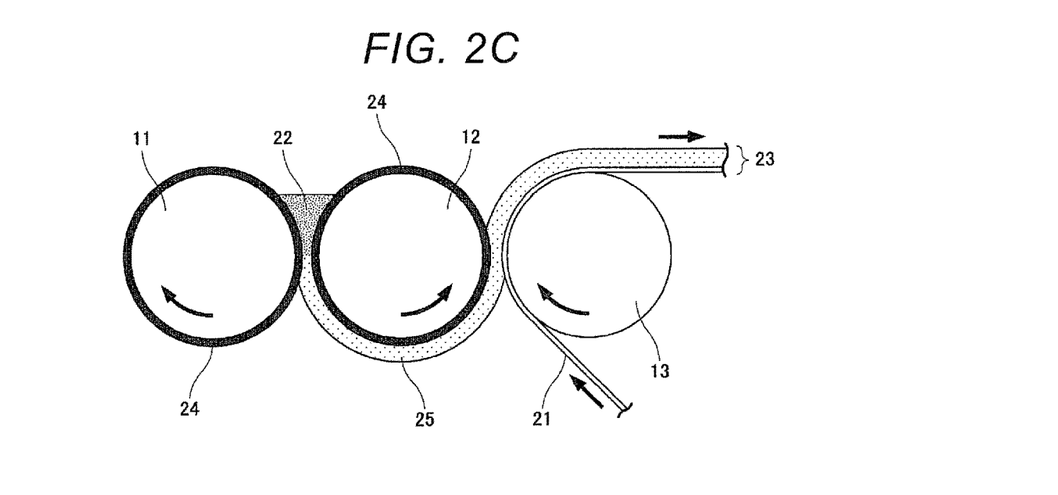

In FIGS. 2A-2C, a process in which a wet mixture coating material 22 is supplied to a gap between the first roll 11 and the second roll 12, thereby forming a coating film 23 is shown (Steps (a) to (c). Each of steps will be described below.

In Step (a) of FIG. 2A, the wet mixture coating material 22 is supplied to a gap between the first roll 11 and the second roll 12, on the surfaces of which any residual mixture coating materials 24 have not yet been formed. The supplied wet mixture coating material 22 starts to spread thinly onto the surfaces of the first roll 11 and the second roll 12 as the first roll 11 and the second roll 12 rotate in the supply direction of the wet mixture coating material 22.

Then, with regard to the first roll 11 shown in Step (b) of FIG. 2B, when the first roll 11 rotates one or more revolutions, a residual mixture coating material 24 is formed on the entire circumferential surface of the first roll 11 among the first roll 11 and the second roll 12 facing each other. In other words, as described below, depending on a circumferential speed ratio of the first roll 11 and the second roll 12, or surface shapes and surface energies of the rolls, only particles in the vicinity of the circumferential surface of the first roll 11 flows while following the rotating direction of the first roll 11, and the rest of the wet mixture coating material 22 follows the second roll 12. Consequently, a thin and uniform film of the residual mixture coating material 24 is stably formed on the circumferential surface of the first roll 11.

At the same time, a coating object 21 is supplied to the second roll 12 shown in Step (c) of FIG. 2C through the third roll 13. The coating object 21 runs along the surface of the third roll 13, and is delivered to a gap between the second roll 12 and the third roll 13. In such a way, the wet mixture coating material 25, which has been formed into a coating film, and the coating object 21 are delivered to a gap between the second roll 12 and the third roll 13, and the wet mixture coating material 25 is transferred onto the surface of the coating object 21. At that time, depending on a circumferential speed ratio of the second roll 12 and the third roll 13, or surface shapes and surface energies of the rolls, only particles in the vicinity of the circumferential surface of the second roll 12 flow while following the rotating direction of the second roll 12, and a thin and uniform film of the residual mixture coating material 24 stably remains on the circumferential surface of the second roll 12, when the wet mixture coating material 25 is transferred from the second roll 12 onto the coating object 21 on the third roll 13. Further, as the second roll 12 rotates one or more revolutions, the residual mixture coating material 24 is formed on the entire circumferential surface of the second roll 12 among the first roll 11 and the second roll 12 facing each other.

Thus, in the early phase of supply of the wet mixture coating material 22, the residual mixture coating material 24 remains on the entire circumferential surfaces of the first roll 11 and the second roll 12. Therefore, in the subsequent coating, the first roll 11 and the second roll 12 can be prevented from coming into direct contact with the wet mixture coating material 22. Consequently, the wet mixture coating material 22 can continuously be supplied against formation of the residual mixture coating material 24, thereby carrying out formation of the coating film 23.

In other words, the supplied wet mixture coating material 22 is delivered to the narrowest gap between the rolls due to the rotations of the first roll 11 and the second roll 12. In this case, since there is a thin layer of the residual mixture coating material 24 formed on the roll surface, the supplied wet mixture coating material 22 will not come into direct contact with the surfaces of the first roll 11 and the second roll 12, but is continuously delivered to the gap, and is rolled there. Then, when the wet mixture coating material 22 passes through the narrowest gap, and receives a shearing force therein, the wet mixture coating material 25 in the form of a coating film is generated. Then, the wet mixture coating material 25, which has been formed into a coating film based on rolling between the rolls, is transferred onto the side of the second roll 12, and moves on the second roll 12 along the rotation of the second roll 12.

In addition, for supply of the wet mixture coating material 22, a method that allows quantitative and flux supply thereof without causing a phenomenon, such as a bridge or rat hole, in which the coating material gets stuck between the rolls is preferable. Specifically, a supply method using a feeder such as a vibration feeder, screw feeder, rotary feeder, roll feeder, belt feeder or apron feeder is preferable.

In this way, by allowing the residual mixture coating material 24 to remain or to be retained on the circumferential surfaces of the first roll 11 and the second roll 12 based on the supply of the wet mixture coating material 22 in the early phase, the wet mixture coating material 22 can be prevented from coming into contact with the rolls, and abrasions of the roll surfaces can be suppressed during the subsequent supply of the wet mixture coating material 22. In addition, formation of the residual mixture coating material 24 may be conducted in the early phase of the supply of the wet mixture coating material 22 in the coating. However, prior to the coating, the residual mixture coating material 24 having a predetermined film thickness can also be formed on the circumferential surfaces of the first roll 11 and the second roll 12 with the supplied wet mixture coating material 22.

Additionally, in the early phase of the coating, or prior to the coating, the entire layer of the residual mixture coating material 24 formed on each of the circumferential surfaces of the first roll 11 and the second roll 12 may continuously remain thereon. However, a portion of the residual mixture coating material 24 may be replaced with the wet mixture coating material 22 supplied by coating. Even in such a case, as the film thickness of the residual mixture coating material 24 is kept constant, the film thickness of the wet mixture coating material 25 in the form of a coating film can precisely be controlled. In other words, in conventional coating film production apparatuses in which such a residual mixture coating material is not formed, a wet mixture coating material remained on the roll surface in an uneven state, and there were cases where a film thickness of the wet mixture coating material in the form of a coating film was not kept uniform. In the coating film production apparatus according to the embodiment, a residual mixture coating material 24 having a predetermined film thickness is formed on each of the circumferential surfaces of the first roll 11 and the second roll 12. Therefore, the film thickness of the residual mixture coating material 24 remaining thereon is kept constant, and the film thickness of the wet mixture coating material 25 in the form of a coating film is kept uniform, even when the supplied wet mixture coating material 22 and the residual mixture coating material 24 are partially replaced with each other. This is because materials of the wet mixture coating material 22 and the residual mixture coating material 24 are the same.

A film thickness of the thin and uniform residual mixture coating material 24 formed on each of the circumferential surfaces of the first roll 11 and the second roll 12 has a relation with a particle diameter of coating particles included in the wet mixture coating material 22, and is preferably a film thickness of 1 or more to 10 or less coating particles. In other words, the film thickness of the residual mixture coating material 24 is preferably 1 to 10 times or less as large as a mean particle diameter of the coating particles. When the film thickness of the residual mixture coating material 24 is within such a range, due to the thin residual mixture coating material 24 remaining on the circumferential surface of the first roll 11 or the second roll 12, the wet mixture coating material 22 charged to a gap between the first roll 11 and the second roll 12 will not come into direct contact with the roll surfaces. Therefore, abrasions of the roll surfaces can be suppressed. If the thickness of the residual mixture coating material 24 is smaller than one time as large as a mean particle diameter of the coating particles, the wet mixture coating material 22 that has been charged to the gap between the first roll 11 and the second roll 12 comes into direct contact with the roll surfaces, and therefore, the roll surfaces will be abraded. On the other hand, if the thickness of the residual mixture coating material 24 is larger than 10 times as large as a mean particle diameter of the coating particles, the thickness of the residual mixture coating material 24 will be intolerable with respect to the thickness of the film formed on the coating object 21, and the residual mixture coating material 24 will unevenly be formed. Consequently, a problem occurs in precision of the coating film weight of the coating film 23.

Next, a configuration of a coating film production apparatus in which two pairs of first rolls 11 and second rolls 12 are combined will be described by using FIG. 3.

Figure 3:
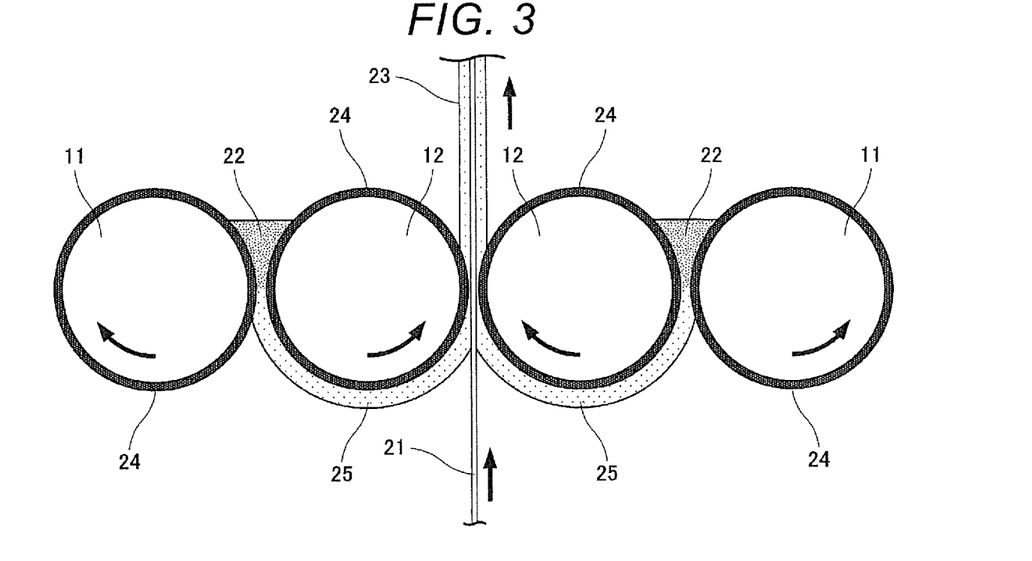
FIG. 3 is a diagram that illustrates an outline configuration of a coating film production apparatus according to an embodiment in which a coating material is transferred onto both surfaces.

FIG. 3 shows a diagram of a configuration that makes it possible to coat both surfaces by combining two pairs of first rolls 11 and second rolls 12 of FIG. 1. When a wet mixture coating material 22 that has penetrated into each of gaps between the first rolls 11 and the second rolls 12 is formed to a wet mixture coating material 25 in the form of a coating film, and the wet mixture coating material 25 is transferred onto each of the circumferential surfaces of the second rolls 12, a thin layer of a residual mixture coating material 24 is formed on each of the circumferential surfaces of the first rolls 11. Also, when the wet mixture coating material 25 in the form of a coating film onto each of the circumferential surfaces of the second rolls 12 is transferred onto a coating object 21, a thin layer of a residual coating material 24 is formed on each of the circumferential surfaces of the second rolls 12. Meanwhile, the wet mixture coating materials 25 that have been formed into coating films on the surfaces of the second rolls 12 are each transferred onto both surfaces of the coating object 21, and a coating film 23 is delivered out. In addition, a plurality of layers can sequentially be coated thereon by combining two or more pairs of first rolls 11 and second rolls 12 of FIG. 1.

Additionally, in configurations of FIGS. 1 and 3, in order to transfer the wet mixture coating material 22 in the form of a coating film from the first roll 11 onto the second roll 12, or in order to transfer the wet mixture coating material 25 in the form of a coating film from the second roll 12 onto the coating object 21, surfaces of the first roll(s) 11 and the second roll(s) 12 are preferably covered with a material with excellent transferability. For example, the surfaces are preferably covered with polyurethane rubber, silicon rubber, fluororubber, chloroprene rubber, nitrile rubber or butyl rubber; polymer materials such as a sintered PTFE product, fluororesin, silicone resin or PEEK resin; inorganic materials such as alumina, silica, titania, nickel, chromium, chromium nitride, zirconia, zinc oxide, magnesia, tungsten carbide, DLC or diamonds; metal materials, composite compound materials or fluorine compounds, or the like. In terms of abrasion resistance, inorganic materials, metal materials or their composite compound materials, or fluorine compounds are preferably used. In addition, in some instances, a surface treatment such as a spray treatment or impregnation coating/plating using a fluororesin/silicone resin can also be carried out thereto. These materials or treatments may be used singularly, or may be mixed or combined, as needed. In addition, the materials are not limited to these substances as long as they have excellent transferability.

The present inventors determined that it was effective to form uneven recesses and projections on the roll surface in order to conduct coating while allowing the wet mixture coating material 22 to remain as a thin layer on the circumferential surface of the first roll 11 or the second roll 12. As for means to form the uneven recesses and projections, a surface processing treatment is preferably carried out, and, for example, the surface roughness can be adjusted by a surface roughening treatment.

Further, based on a simulation of a degree of surface roughness, the present inventors calculated a surface roughness that makes it possible to appropriately form the residual mixture coating material 24. That is, the present inventors found out that, when arithmetical mean roughnesses Ra of the first roll 11 and the second roll 12 are larger than 0.05 times as large as a particle diameter $D_{10}$ where a cumulative distribution rate of a particle diameter of coating particles included in the wet mixture coating material 22 is 10%, and is smaller than 20 times as large as a particle diameter $D_{90}$ where the cumulative distribution rate is 90%, coating can be carried out while allowing the wet mixture coating material 22 to remain thereon in a thin state.

More specifically, the following explanations will be provided.

A lower limit for the surface roughness is defined by a particle diameter $D_{10}$ where a cumulative distribution rate of a particle diameter of coating particles included in the wet mixture coating material 22 that is measured, for example, with a particle size analyzer is 10%, and an arithmetic mean roughness Ra of the roll surface. In order to allow the wet mixture coating material 22 to remain thereon in a thinner state, for example, as compared with a case of a mirror surface, an arithmetic mean roughness Ra that satisfies the following relational expression is preferably selected.

$$D_{10} \times 0.05 < Ra \qquad \text{(Expression 1)}$$

An upper limit for the surface roughness is defined by a particle diameter $D_{90}$ where a cumulative distribution rate of a particle diameter of coating particles included in the wet mixture coating material 22 that is measured with a particle size analyzer is 90%, and an arithmetic mean roughness Ra of the roll surface. In order to allow the wet mixture coating material 22 to remain thereon in a thinner state, for example, as compared with a case of a mirror surface, an arithmetic mean roughness Ra that satisfies the following relational expression is preferably selected.

$$Ra < D_{10} \times 50 \qquad \text{(Expression 2)}$$

If a degree of the surface roughness is smaller than $D_{10} \times 0.05$, it becomes impossible to allow the wet mixture coating material 22 to remain on the roll surface in a thin state, and the roll surface will be abraded. On the other hand, if a degree of the surface roughness is larger than $D_{90} \times 50$, the wet mixture coating material 22 will uniformly penetrate into recessed portions of the roll surface, and therefore, it is impossible to allow the wet mixture coating material 22 to uniformly remain on the roll surface in a thin state, resulting in inferior precision of the coating film weight.

In addition, the arithmetic mean roughness Ra is a value that is obtained in the following way: partial roughness curves that have a reference length with respect to the direction of a height standard line are extracted from a roughness curve, they are folded to the upper side, an area of figures enclosed by the folded partial roughness curves and the height standard line is divided by the reference length to thereby obtain the value for Ra.

In order to adjust a weight of the wet mixture coating material transferred per unit area of the coating object 21 to a predetermined value, i.e., a predetermined weight (g/m$^2$) of an electrode mixture, the gap between the first roll 11 and the second roll 12 and the gap between the second roll 12 and the coating object 21 to which the wet mixture coating material 22 is supplied can arbitrarily be set. Alternatively, a circumferential speed ratio $R_{12}$ of the first roll 11 and the second roll 12, and a circumferential speed ratio $R_{23}$ of the second roll 12 and the third roll 13 can arbitrarily be set.

The circumferential speed ratio $R_{12}$ (a circumferential speed of the second roll 12/a circumferential speed of the first roll 11) in this case is desirably larger than 1 in order to obtain more superior transferability. Furthermore, in a state where the wet mixture coating material 25 is transferred from the first roll 11 onto the second roll 12, in the form of a coating film, it may be acceptable that the circumferential speed ratio is significantly larger. However, in order to form a uniform film thickness, the circumferential speed ratio $R_{12}$ is desirably 30 or less. That is, the circumferential speed ratio is desirably within a range of larger than 1 to 30. If the circumferential speed ratio $R_{12}$ is 1 or less, untransferred portion of the coating material may be caused on the first roll 11, and therefore, the coating material cannot uniformly be transferred onto the second roll 12. On the other hand, the circumferential speed ratio $R_{12}$ is larger than 30, a uniform film of the wet mixture coating material 25 cannot be formed on the second roll 12.

Meanwhile, the circumferential speed ratio $R_{23}$ (a circumferential speed of the third roll 13/a circumferential speed of the second roll 12) is desirably larger than 1 in order to obtain more superior transferability. Furthermore, in a state where the wet mixture coating material 25 is transferred from the second roll 12 onto the coating object 21 on the third roll 13, in the form of a coating film, it may be acceptable that the circumferential speed ratio is significantly larger. However, in order to form a uniform film thickness, the circumferential speed ratio $R_{23}$ is desirably 30 or less. That is, the circumferential speed ratio is desirably within a range of 1 or more to 30 or less. If the circumferential speed ratio $R_{23}$ is smaller than 1, untransferred portions of the coating material may be caused on coating object 21 on the third roll 13, and therefore, the coating material cannot uniformly be transferred. On the other hand, if the circumferential speed ratio $R_{13}$ is larger than 30, a uniform film of the wet mixture coating material 25 cannot be formed on the coating object 21.

Furthermore, the inventors determined that, by adjusting wettability of each roll and the coating object 21 with respect to a solvent that constitutes the wet mixture coating material 22, transferability of the residual mixture coating material 24 and the wet mixture coating material 25 from the first roll 11 to the second roll 12 or from the second roll 12 to the coating object 21 can be controlled. That is, a surface contact angle $\theta(1)$ between the first roll 11 and a solvent for the wet mixture coating material 22, a surface contact angle $\theta(2)$ between the second roll 12 and the solvent for the wet mixture coating material 22, and a surface contact angle $\theta(3)$ between the coating object 21 and a solvent for the wet mixture coating material 22 desirably get smaller in that order along the moving direction. In other words, it is preferable that $\theta(1)$ is equal to or larger than $\theta(2)$, and that $\theta(2)$ is larger than $\theta(3)$. This is expressed by the following relational expressions:

$$\theta(1) \geq \theta(2) \quad \text{(Expression 3)}$$

and $$\theta(2) > \theta(3) \quad \text{(Expression 4).}$$

More specifically, the following explanations are provided.

When a relation as defined by Expression 3 is present between surface contact angles $\theta(1)$ and $\theta(2)$, the solvent wettability of the second roll 12 will be higher than that of the first roll 11, and the wet mixture coating material 22 more easily adheres to the surface of the second roll 12 rather than to the surface of the first roll 11. Consequently, the wet mixture coating material 22 is difficult to remain on the surface of the first roll 11.

In the same manner, when a relation as defined by Expression 4 is present between surface contact angles $\theta(2)$ and $\theta(3)$, the solvent wettability of the coating object 21 will be higher than that of the second roll 12, and the wet mixture coating material 22 more easily adheres to the surface of the coating object 21 rather than to the surface of the second roll 12. Consequently, the wet mixture coating material 22 is difficult to remain on the surface of the second roll 12.

The surface contact angle $\theta(1)$ is preferably smaller than 150°. If the surface contact angle $\theta(1)$ is equal to or larger than 150°, the surface energy of the first roll 11 may still be considerably high, and, in general, it becomes difficult to secure durability. Then, the surface contact angle $\theta(1)$ may become smaller due to abrasions caused from the long-term use, or uneven distribution of the solvent in the wet mixture coating material 22, which is a wet coating film material, occurs, and a volume solid fraction of the wet mixture coating material 22 may become locally lower. As a result, the wet mixture coating material 25 becomes uneven, and untransferred portions with an intolerable thickness of the wet mixture coating material 25 occur, and, consequently, it likely becomes difficult to completely transfer the wet mixture coating material 25 onto the coating object 21.

The surface contact angle $\theta(3)$ is preferably larger than 3°. If the surface contact angle $\theta(3)$ is equal to or smaller than 3°, the solvent of the wet mixture coating material 25 will gather in a boundary face of a contact face between the coating object 21 and the wet mixture coating material 22, and a volume solid fraction of the wet mixture coating material 25 in the boundary face will become considerably low. Then, there may be a case where the strength of the coating film of the wet mixture coating material 25 becomes low. As a result, the wet mixture coating material 25 will be uneven, and untransferred portions with intolerable film thickness of the wet mixture coating material 25 will occur, and, consequently, it likely becomes difficult to completely transfer the wet mixture coating material 25 onto the coating object 21.

In order to differentiate the surface contact angles among the rolls, a surface processing treatment is preferably carried out against each of rolls or the coating object 21. For example, for rolls, besides the above-described materials with excellent transferability, a surface roughening treatment (blast treatment, etc.), a spray treatment, and a surface treatment such as impregnation coating/plating using a fluororesin, silicone resin or the like can be combined. Additionally, these materials or treatments can be used singularly, or may be mixed or combined, as needed to thereby adjust the surface contact angles. Furthermore, for the coating object, the surface contact angle can be adjusted by a chromate treatment/corona treatment, an anti-rust treatment, a carbon-coating treatment or the like.

In FIGS. 1 to 3, a volume solvent content of the wet mixture coating material 22 supplied to the gap between the first roll 11 and the second roll 12 is desirably 20 vol % or more to 62% vol % or less.

When the volume solvent content is within such a range, the wet mixture coating material 22 does not have fluidity because a solvent exists only around surfaces of the coating particles in the wet mixture coating material 22 or in the vicinity of the coating particles. If the volume solvent content is higher than 62 vol %, the wet mixture coating material 22 likely has fluidity. Therefore, in that case, the wet mixture coating material 22 adheres to both the sides of the first roll 11 and the coating object 21, and it becomes difficult to generate the wet mixture coating material 25 in the form of a coating film. On the other hand, if the volume solvent content is lower than 20 vol %, almost no spaces between coating particles in the wet mixture coating material 22 is filled with a solvent. Consequently, the wet mixture coating material 22 cannot be formed into a coating film, and the wet mixture coating material 25 cannot be transferred onto the side of the coating object 21.

Thus, by adjusting the volume solvent content of the wet mixture coating material 22 to a range of 20 vol % or more to 62 vol % or less, the wet mixture coating material 25 in the form of a coating film can be transferred onto the coating object 21 with high precision.

Figure 4:
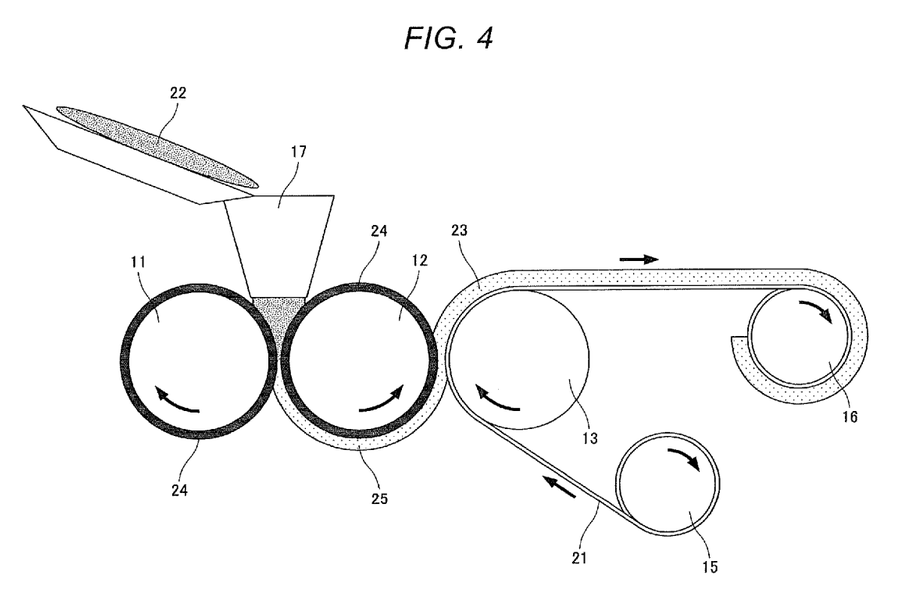
FIG. 4 is a diagram that illustrates an overall configuration of a coating film production apparatus according to an embodiment.

FIG. 4 shows a schematic diagram that illustrates an overall structure of a coating film production apparatus according to an embodiment. The wet mixture coating material 22 is supplied to the gap between the first roll 11 and the second roll 12 through a coating material-supplying hopper 17 that is placed above the gap between the first roll 11 and the second roll 12, and the wet mixture coating material 25 in the form of a coating film is transferred onto the second roll 12. The coating object 21 is delivered from a feeder 15, and runs on the lower surface of the third roll 13, and the wet mixture coating material 25 in the form of a coating film is transferred thereto between the second roll 12 and the third roll 13. The coating film 23 with the transferred coating film of the wet mixture coating material 25 is wound by a winder 16. Before the coating film 23 is delivered to the winder 16, the coating film 23 may be subjected to a subsequent step such as a pressing step, drying step, stripping step, or slit step, as needed. In addition, without conducting the winding step, a next step such as a lamination step or assembly step may directly be carried out.

Figure 6:
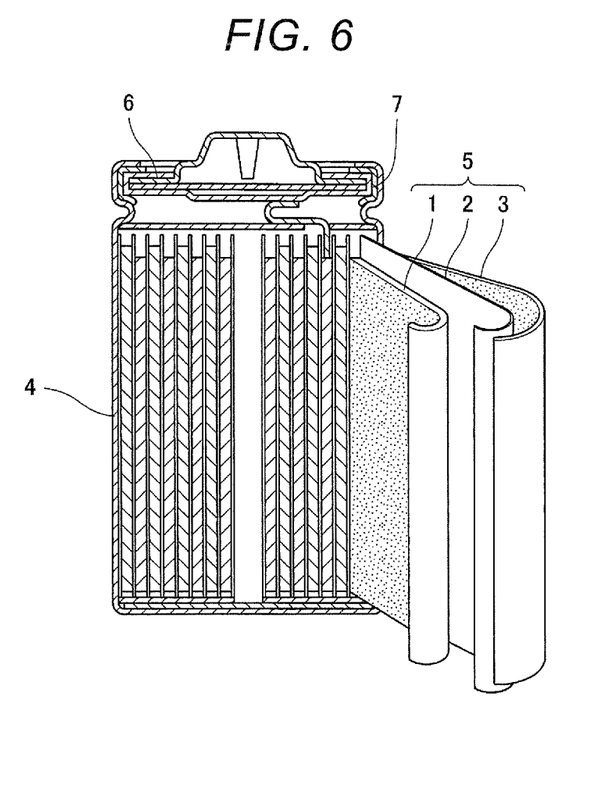
FIG. 6 is a schematic diagram that shows a vertical section of a nonaqueous rechargeable battery produced according to an embodiment.

FIG. 6 shows a vertical section schematic diagram of a nonaqueous rechargeable battery using an anode plate and a cathode plate that are coating films produced by the coating film production apparatus and the coating film production method according to an embodiment. For assembly of a cylindrical lithium rechargeable battery, which is an example of a nonaqueous rechargeable battery, a cathode plate 1 using a composite lithium oxide as an active material, and an anode plate 3 using a lithium-retaining material as an active material are coiled through a separator 2; the coiled electrode plate group 5 is then installed inside a cylindrical battery case 4 with a bottom; a predetermined quantity of an electrolytic solution including a nonaqueous solvent is then poured into the battery case 4; a sealing plate 6 with a gasket 7 around its rim is inserted into an opening of the battery case 4; and the opening of the battery case 4 is folded inward to seal the battery, as shown in FIG. 6.

Examples and comparative examples in experiments conducted by the present inventors will be described below by using FIGS. 1 to 3.

EXAMPLES

Example 1

A cathode plate was prepared.

At first, a coating material for a cathode mixture was prepared in the following manner.

100 parts by volume of a nickel-based cathode material as a cathode active material ($D_{10}$: 6 µm, $D_{50}$: 12 µm, $D_{90}$: 19 µm), 2.0 parts by volume of PVDF as a binder in terms of solid content of the binder relative to 100 parts by volume of the active material, 3.0 parts by volume of acetylene black as a conductive material relative to 100 parts by volume of the active material, and a predetermined amount of NMP were stirred with a dual arm kneading machine, thereby preparing a cathode mixture coating material having a volume solvent content of 40%.

A configuration of rolls used for the preparation of the cathode mixture coating material was as follows.

As shown in FIG. 1, a first roll 11 and a second roll 12, as well as the second roll 12 and a third roll 13 were placed parallel to one another such that gaps of 100 µm were formed therebetween. Materials for the first roll 11, the second roll 12 and the third roll 13 were SUS, and their surfaces were subjected to a hard chromium plating treatment. The surfaces of the first roll 11 and the second roll 12 were each roughened based on a blast treatment, and their surfaces were covered with DLC films. The surface roughnesses Ra were 0.5 µm.

Both of the surface contact angles $\theta(1)$ and $\theta(2)$, i.e., surface contact angles between the solvent for the coating material and the roll surfaces that are positions of the first roll 11 and the second roll 12 where the coating object ran (hereinafter, also referred to as A/B roll contact angles) were adjusted to 65°.

A surface contact angle $\theta(3)$ (referred to as coating object contact angle in Table 1; the same shall apply hereafter), which was a surface contact angle between the surface of the coating object 21 and the solvent for the wet mixture coating material 25, was adjusted to 25°.

For the coating object 21 that was passed through the gap between the second roll 12 and the third roll 13, an aluminum foil with a thickness of 15 µm was used, and the aluminum foil was allowed to move at the same speed as the circumferential speed of the third roll 13. The circumferential speed of the second roll 12 was set to 30 m/min, the circumferential speed of the third roll 13 was set to 45 m/min, and the circumferential speed of the first roll 11 was set to 7.5 m/min so that the AB circumferential speed ratio (the circumferential speed of the second roll 12/the circumferential speed of the first roll 11) indicated 4.

Then, the prepared cathode mixture coating material was supplied to the gap between the first roll 11 and the second roll 12. A coating film was formed on the second roll 12, and then, the coating film was transferred from the second roll 12 onto the aluminum foil. Then, the solvent was volatilized in a drying step, and the resulting product was subjected to compression molding in a press step, thereby preparing a cathode plate.

In addition, only methods for preparation of cathode plates in Example 2 and Comparative Examples 1 to 9 were different from the method in Example 1.

Evaluations on cathode plates were carried out based on coating film transferability and abrasion resistance, and the methods therefor were as follows.

For evaluations on the coating film transferability, it was determined whether or not a wet mixture coating material 25 was transferred from the first roll 11 onto the coating object 21 running on the third roll 13 through the second roll 12, in the form of a coating film. In addition, those for which untransferred portions of the coating material, which could influence on precision of the coating film weight, were observed were evaluated as inferior.

Evaluations on the abrasion resistance were conducted when the coating film transferability was evaluated as superior, and degrees of abrasions of surfaces of the first roll 11 and the second roll 12 were determined. In addition, those for which the roll surfaces were scraped due to the abrasions were evaluated as inferior.

Example 2

In Example 2, a cathode plate was prepared in the same manner as Example 1 except that surface roughnesses Ra of the first roll 11 and the second roll 12 were adjusted to 3 μm.

Comparative Example 1

In Comparative Example 1, a cathode plate was prepared in the same manner as Example 1 except that surface roughnesses Ra of the first roll 11 and the second roll 12 were adjusted to 0.1 μm.

Comparative Example 2

In Comparative Example 2, a cathode plate was prepared in the same manner as Example 1 except that surface roughnesses Ra of the first roll 11 and the second roll 12 were adjusted to 1000 μm.

Comparative Example 3

In Comparative Example 3, a cathode plate was prepared in the same manner as Example 1 except that the AB circumferential speed ratio was adjusted to 0.9.

Comparative Example 4

In Comparative Example 4, a cathode plate was prepared in the same manner as Example 1 except that the AB circumferential speed ratio was adjusted to 35.

Comparative Example 5

In Comparative Example 5, a cathode plate was prepared in the same manner as Example 1 except that both of the surface contact angles θ(1) and θ(2), i.e., A/B roll contact angles between the solvent for the wet mixture coating material 22 and the rolls surfaces regarding the first roll 11 and second roll 12, were adjusted to 154°.

Comparative Example 6

In Comparative Example 6, a cathode plate was prepared in the same manner as Example 1 except that a surface contact angle θ(3), which was a surface contact angle between the surface of the coating object 21 and the solvent for the wet mixture coating material 25, was adjusted to 1°.

Comparative Example 7

In Comparative Example 7, a cathode plate was prepared in the same manner as Example 1 except that both of the surface contact angles θ(1) and θ(2), i.e., A/B roll contact angles between the solvent for the wet mixture coating material 22 and the rolls surfaces regarding the first roll 11 and the second roll 12, were adjusted to 18°.

Comparative Example 8

In Comparative Example 8, a cathode plate was prepared in the same manner as Example 1 except that a volume solvent content of the wet mixture coating material 22 was adjusted to 15%.

Comparative Example 9

In Comparative Example 9, a cathode plate was prepared in the same manner as Example 1 except that a volume solvent content of the wet mixture coating material 22 was adjusted to 66%.

Example 3

An anode plate was prepared.

At first, a coating material for an anode mixture was prepared in the following manner.

100 parts by volume of artificial graphite as an anode active material ($D_{10}$: 8 μm, $D_{50}$: 21 μm, $D_{90}$: 42 μm), 2.3 parts by volume of a styrene/butadiene copolymer rubber particle dispersion as a binder in terms of solid content of the binder relative to 100 parts by volume of the active material, 1.4 parts by volume of carboxymethyl cellulose as a thickener relative to 100 parts by volume of the active material, and a predetermined amount of water were stirred with a dual arm kneading machine, thereby preparing an anode mixture coating material having a volume solvent content of 45%.

A configuration of rolls used for the preparation of the anode mixture coating material was as follows.

As shown in FIG. 1, a first roll 11 and a second roll 12, as well as the second roll 12 and a third roll 13 were placed parallel to one another such that gaps of 100 μm were formed therebetween. Materials of the first roll 11, the second roll 12 and the third roll 13 were SUS, and their surfaces were subjected to a hard chromium plating treatment.

The surfaces of the first roll 11 and the second roll 12 were each roughened based on a blast treatment, and their surfaces were covered with DLC films. The surface roughnesses Ra were adjusted to 0.5 μm. The surface contact angles θ(1) and θ(2), i.e., A/B roll contact angles regarding the first roll 11 and the position of the second roll 12 where the coating object ran, were adjusted to 105°.

A surface contact angle θ(3), which was a copper foil contact angle between the surface of the coating object 21 and the wet mixture coating material 25, was adjusted to 75°.

For the coating object 21 that was passed through the gap between the second roll 12 and the third roll 13, a copper foil with a thickness of 15 μm was used, and the copper foil was allowed to move at the same speed as the circumferential speed of the third roll 13. The circumferential speed of the second roll 12 was set to 30 m/min, the circumferential speed of the third roll 13 was set to 45 m/min, and the circumferential speed of the first roll 11 was set to 7.5 m/min so that the AB circumferential speed ratio (the circumferential speed of the second roll 12/the circumferential speed of the first roll 11) indicated 4.

Then, the prepared anode mixture coating material was supplied to the gap between the first roll 11 and the second roll 12. A coating film was formed on the second roll 12, and then, the coating film was transferred onto the copper foil on the second roll 12. Then, the solvent was volatilized in a drying step, and the coating film was subjected to compression molding in a pressing step to prepare an anode plate.

In addition, only methods for preparation of anode plates in Example 4 and Comparative Examples 10 to 18 were different from the method in Example 3.

Evaluations on anode plates were carried out based on coating film transferability in the same manner as Example 1, and the methods therefor are as follows.

For evaluations on the coating film transferability, it was determined whether or not a wet mixture coating material 22 was transferred from the first roll 11 onto the coating object 21 running on the third roll 13 through the second roll 12, in the form of a coating film.

Evaluations on the abrasion resistance were conducted when the coating film transferability was evaluated as superior, and degrees of abrasions of surfaces of the first roll 11 and the second roll 12 were determined.

Example 4

In Example 4, an anode plate was prepared in the same manner as Example 3 except that surface roughnesses Ra of the first roll 11 and the second roll 12 were adjusted to 3 μm.

Comparative Example 10

In Comparative Example 10, an anode plate was prepared in the same manner as Example 3 except that surface roughnesses Ra of the first roll 11 and the second roll 12 were adjusted to 0.1 μm.

Comparative Example 11

In Comparative Example 11, an anode plate was prepared in the same manner as Example 3 except that surface roughnesses Ra of the first roll 11 and the second roll 12 were adjusted to 2200 μm.

Comparative Example 12

In Comparative Example 12, an anode plate was prepared in the same manner as Example 3 except that the AB circumferential speed ratio was adjusted to 0.9.

Comparative Example 13

In Comparative Example 13, an anode plate was prepared in the same manner as Example 3 except that the AB circumferential speed ratio was adjusted to 35.

Comparative Example 14

In Comparative Example 14, an anode plate was prepared in the same manner as Example 3 except that both of the surface contact angles θ(1) and θ(2), i.e., A/B roll contact angles between the wet mixture coating material 22 and the rolls surfaces regarding the first roll 11 and the second roll 12, were adjusted to 160°.

Comparative Example 15

In Comparative Example 15, an anode plate was prepared in the same manner as Example 3 except that a surface contact angle θ(3), which was a copper foil contact angle between the surface of the coating object 21 and the wet mixture coating material 25, was adjusted to 1°.

Comparative Example 16

In Comparative Example 16, an anode plate was prepared in the same manner as Example 3 except that both of the surface contact angles θ(1) and θ(2), i.e., A/B roll contact angles between the wet mixture coating material 22 and the rolls surfaces regarding the first roll 11 and the second roll 12, were adjusted to 67°.

Comparative Example 17

In Comparative Example 17, an anode plate was prepared in the same manner as Example 3 except that a volume solvent content of the wet mixture coating material 22 was adjusted to 15%.

Comparative Example 18

In Comparative Example 18, an anode plate was prepared in the same manner as Example 3 except that a volume solvent content of the wet mixture coating material 22 was adjusted to 64%.

Measurement results in Examples 1 to 4 and Comparative Examples 1 to 18 are shown in Table 1.

TABLE 1

| Item Unit | Type of coating material — | Ra μm | AB circumferential speed — | A/B roll contact angle ° | Coating object contact angle ° | Volume solvent content % | Transferability — | Abrasion resistance — |
|---|---|---|---|---|---|---|---|---|
| Example 1 | Cathode | 0.5 | 4 | 65 | 25 | 40 | Superior | Superior |
| Example 2 | Cathode | 3 | 4 | 65 | 25 | 40 | Superior | Superior |
| Example 3 | Anode | 0.5 | 4 | 105 | 75 | 45 | Superior | Superior |
| Example 4 | Anode | 3 | 4 | 105 | 75 | 45 | Superior | Superior |
| Comparative Example 1 | Cathode | 0.1 | 4 | 65 | 25 | 40 | Superior | Inferior |
| Comparative Example 2 | Cathode | 1000 | 4 | 65 | 25 | 40 | Inferior | — |
| Comparative Example 3 | Cathode | 0.5 | 0.9 | 65 | 25 | 40 | Inferior | — |
| Comparative Example 4 | Cathode | 0.5 | 35 | 65 | 25 | 40 | Inferior | — |
| Comparative Example 5 | Cathode | 0.5 | 4 | 154 | 25 | 40 | Inferior | — |
| Comparative Example 6 | Cathode | 0.5 | 4 | 65 | 1 | 40 | Inferior | — |
| Comparative Example 7 | Cathode | 0.5 | 4 | 18 | 25 | 40 | Inferior | — |
| Comparative Example 8 | Cathode | 0.5 | 4 | 65 | 25 | 15 | Inferior | — |
| Comparative Example 9 | Cathode | 0.5 | 4 | 65 | 25 | 66 | Inferior | — |

TABLE 1-continued

| Item<br>Unit | Type of coating material<br>— | Ra<br>μm | AB circumferential speed<br>— | A/B roll contact angle<br>° | Coating object contact angle<br>° | Volume solvent content<br>% | Transferability<br>— | Abrasion resistance<br>— |
|---|---|---|---|---|---|---|---|---|
| Comparative Example 10 | Anode | 0.1 | 4 | 105 | 75 | 45 | Superior | Inferior |
| Comparative Example 11 | Anode | 2200 | 4 | 105 | 75 | 45 | Inferior | — |
| Comparative Example 12 | Anode | 0.5 | 0.9 | 105 | 75 | 45 | Inferior | — |
| Comparative Example 13 | Anode | 0.5 | 35 | 105 | 75 | 45 | Inferior | — |
| Comparative Example 14 | Anode | 0.5 | 4 | 160 | 75 | 45 | Inferior | — |
| Comparative Example 15 | Anode | 0.5 | 4 | 105 | 1 | 45 | Inferior | — |
| Comparative Example 16 | Anode | 0.5 | 4 | 67 | 75 | 45 | Inferior | — |
| Comparative Example 17 | Anode | 0.5 | 4 | 105 | 75 | 15 | Inferior | — |
| Comparative Example 18 | Anode | 0.5 | 4 | 105 | 75 | 64 | Inferior | — |

As apparent from Table 1, with regard to Examples 1 to 4, a thin layer of a residual mixture coating material 24 was formed on each of the circumferential surfaces of the first roll 11 and the second roll 12, and thus, the roll surfaces were not abraded. In addition, the surface roughnesses Ra of the first roll 11 and the second roll 12 satisfied the relational expressions regarding the relation to a diameter of coating particles, i.e., Expressions 1 and 2, the AB circumferential speed ratios and volume solvent contents of the coating materials were set within suitable ranges, and surface contact angles of the first roll 11 and the second roll 12 against the solvent of the wet mixture coating material were set such that they were larger than a surface contact angle of the coating object 21. Consequently, superior transferability was obtained.

In Comparative Examples 1, 2 and 10 to 11 in which surface roughnesses Ra of the first roll 11 and the second roll 12 did not satisfy relational expressions regarding the relation to a particle diameter, i.e. (Expression 1) and (Expression 2), the surfaces of the first roll 11 and the second roll 12 were abraded, or the transferability became inferior, and a superior coating film could not be produced.

In Comparative Examples 3, 4 and 12 to 13 in which the circumferential speed ratios of the first roll 11 and the second roll 12 were made smaller than 1 or larger than 30, the transferability from the first roll 11 onto the second roll 12 became inferior, and a superior coating film could not be produced.

In Comparative Examples 5 and 14 in which A/B contact angles of the roll surfaces regarding the first roll 11 and the second roll 12 were made larger than 150°, the transferability from the second roll 12 onto the coating object 23 became inferior, and, as a result, portions of the coating materials remained on the second roll 12.

In Comparative Examples 6 and 15 in which the coating object contact angles of the surface of the coating object 21 were made smaller than 3°, the transferability from the second roll 12 onto the coating object 21 became inferior, and, consequently, portions of the coating materials remained on the second roll 12.

In Comparative Examples 7 and 16 in which surface contact angles θ(1) and θ(2) of the first roll 11 and the second roll 12 were smaller than surface contact angles θ(3) of the coating object 21, the transferability from the second roll 12 onto the coating object 21 became inferior, and, consequently, portions of the coating materials remained on the second roll 12.

In Comparative Examples 8 to 9 and 17 to 18 in which the volume solvent contents of the coating materials deviated from the range of 20% to 62%, the transferability from the first roll 11 onto the second roll 12 was inferior, and, consequently, most of the coating materials remained on the first roll 11, or most of the coating materials dropped out.

Based on the above-described evaluations, when a residual coating material layer remained on surfaces of the first roll 11 and the second roll 12, abrasions of the rolls and the coating materials could be suppressed. When surface roughnesses of the first roll 11 and the second roll 12 satisfied Expressions 1 and 2 that were relational expressions regarding relations to a diameter of coating particles, and circumferential speed ratios were within a predetermined range, superior transferability and abrasion resistance could be obtained. In addition, when surface contact angles of the first roll 11 and the second roll 12 were larger than a surface contact angle of the coating object 21, and a volume solvent content of a coating material was within a range of 20 vol % to 62 vol %, superior transferability could be obtained. Thus, it was revealed that contamination of extraneous materials could be prevented, thereby providing a rechargeable battery with excellent safety and output properties.

The rolls for production of a coating film, the coating film, and the production apparatus using the same according to the various embodiments make it possible to prevent contamination of extraneous materials, thereby improving maintenance performance of rolls for the production. Besides an electrode plate for rechargeable batteries as mentioned above, the coating film can be expanded to membrane members for primary batteries, capacitors, ferrite sheets, or fuel batteries; resin membranes for water softeners; and other functional resin membranes. By expanding the coating film to an electrode for rechargeable batteries as described above, rechargeable batteries with excellent output properties can be obtained, and they are useful as power supplies or the like that have been demanded to have higher outputs. Specifically, the coating film is useful for mobile bodies such as electronic equipment (personal computers, electric storage devices, cellular phones, smartphones, digital still cameras, TVs, video cameras, etc.), electric tools (electric drills, electric screwdrivers, etc.), vehicles (automobiles, bicycles, wheelchairs, motor scooters, motorcycles, welfare vehicles, steam trains) and transportations (electric trains, cranes, ships, airplanes). Furthermore, the coating film can also be applied to power storage systems as emergency power sources. In other words, the coating film can be applied to all products that require a power supply.

According to the various embodiments, it is possible to suppress abrasions between rolls and a coating material in methods that rolls the coating material between the rolls to forma coating film, followed by transfer of the coating film onto a coating object, and is useful for a coating film production method and a coating film production apparatus that produce a coating film by transfer of a coating material onto a coating object, as well as for a coating film, a nonaqueous rechargeable battery electrode, a mobile body, etc.

What is claimed is:

1. A coating film production method, comprising:
    allowing a coating material to penetrate into a gap between a first roll and a second roll that rotates in an opposite direction to the first roll, to generate a coating film on a surface of the second roll; and
    transferring the coating film generated on the surface of the second roll onto a running coating object,
    wherein arithmetic mean roughnesses Ra of the surfaces of the first roll and the second roll satisfy $0.05 \times D_{10} < Ra < 50 \times D_{90}$,
    wherein $D_{10}$ is a particle diameter where a cumulative distribution rate of coating particles included in the coating material is 10%, and $D_{90}$ is a particle diameter where the cumulative distribution rate is 90%,
    a portion of the coating material penetrated into the gap between the first roll and the second roll is transferred onto the second roll,
    a portion of the coating film generated on the surface of the second roll is transferred onto the coating object,
    a residual coating material excluding the portion of the coating material is generated on each of an entire circumferential surface of the first roll and the second roll as a residual coating material layer, and
    a film thickness of the residual coating material layer is smaller than that of the coating film transferred onto the coating object.

2. The coating film production method according to claim 1, the method comprising:
    a first step of rolling, by a shearing force, the coating material penetrated into the gap between the first roll and the second roll, in a state where each of the entire circumferential surface of the first roll and the second roll are each covered with a residual coating material layer;
    a second step of transferring the coating film onto a top of the residual coating material layer of the second roll while allowing the residual coating material layer to remain on the surface of the first roll;
    a third step of transferring the coating material on the surface of the second roll onto the running coating object; and
    causing the coating material that has not been transferred onto the coating object in the third step and remained on the second roll to be a residual coating material layer and rotating the second roll toward the gap.

3. The coating film production method according to claim 1, wherein a thickness of the residual coating material layer is 1 to 10 times or less as large as a mean particle diameter of coating particles included in the coating material.

4. The coating film production method according to claim 1, wherein the supplied coating material has a volume solvent content of 20 vol % or more to 62 vol % or less.

5. The coating film production method according to claim 1, wherein the coating object is supplied by a third roll, the coating film is transferred onto the coating object between the second roll and the third roll, a ratio of a circumferential speed of the second roll/a circumferential speed of the first roll is adjusted to be larger than 1 to 30 or less, and a ratio of a circumferential speed of the third roll/the circumferential speed of the second roll is adjusted to 1 or more to 30 or less.

6. The coating film production method according to claim 5, wherein $\theta(1) \geq \theta(2) > \theta(3)$ where $\theta(1)$ is a surface contact angle between the first roll and a solvent for the coating material, $\theta(2)$ is a surface contact angle between the second roll and the solvent for the coating material, and $\theta(3)$ is a surface contact angle between the third roll and a solvent for the coating material in the form of the coating film that is transferred onto the coating object.

7. The coating film production method according to claim 6, wherein $150° > \theta(1)$ and $\theta(3) > 3°$.

8. A coating film production apparatus that transfers a coating material including coating particles onto a top of a coating object to coat the coating material thereon, the apparatus comprising:
    a first roll and a second roll that roll the supplied coating material to generate the coating material in the form of a coating film;
    and
    a residual coating material layer that remains on each of an entire circumferential surface of the first roll and the second roll, wherein
    arithmetic mean roughnesses Ra of the surfaces of the first roll and the second roll satisfy $0.05 \times D10 < Ra < 50 \times D90$, in a case where D10 is a particle diameter where a cumulative distribution rate of the coating particles included in the coating material, which is measured by a particle size analyzer, is 10%, and D90 is a particle diameter where the cumulative distribution rate is 90%,
    the coating material is supplied from a gap between the top of the residual coating material layer that has remained on the surface of the first roll and the top of the residual coating material layer that has remained on the surface of the second roll,
    a portion of the coating material penetrated into a gap between the first roll and the second roll is transferred onto the second roll,
    a portion of the coating material generated on the second roll is transferred onto the coating object,
    a residual coating material excluding the portion of the coating material is generated on each of the entire circumferential surface of the first roll and the second roll as the residual coating material layer, and
    a film thickness of the residual coating material layer is smaller than that of a coating film transferred onto the coating object.

9. The coating film production apparatus according to claim 8, wherein a thickness of the residual coating material layer is 1 to 10 times or less as large as a mean particle diameter of the coating particles included in the coating material.

10. The coating film production apparatus according to claim 8, further comprising:

a third roll that supplies the coating object, wherein $\theta(1) \geq \theta(2) > \theta(3)$ where $\theta(1)$ is a contact angle between the first roll and a solvent for the coating material, $\theta(2)$ is a contact angle between the second roll and the solvent for the coating material, and $\theta(3)$ is a contact angle between the third roll and a solvent for the coating material in the form of the coating film.

11. The coating film production apparatus according to claim 10, wherein $150° > \theta(1)$ and $\theta(3) > 3°$.

\* \* \* \* \*